United States Patent [19]

Siemers et al.

[11] Patent Number: 5,074,923

[45] Date of Patent: Dec. 24, 1991

[54] METHOD FOR ID SIZING OF FILAMENT REINFORCED ANNULAR OBJECTS

[75] Inventors: Paul A. Siemers, Clifton Park; Stephen F. Rutkowski, Duanesburg, both of N.Y.

[73] Assignee: General Electric Company, Schenectady, N.Y.

[21] Appl. No.: 498,794

[22] Filed: Mar. 26, 1990

[51] Int. Cl.$^5$ .................. B32B 15/14; B22F 7/00
[52] U.S. Cl. ................... 148/11.5 Q; 29/419.1; 164/46; 148/127; 148/128; 228/190; 228/263.12
[58] Field of Search ............... 148/11.5 Q, 127, 128; 228/190, 263.12; 164/46; 29/419.1

[56] References Cited

U.S. PATENT DOCUMENTS

| | | | |
|---|---|---|---|
| 3,728,886 | 4/1973 | Wightman | 72/364 |
| 4,602,952 | 7/1986 | Greene et al. | 148/127 |
| 4,782,884 | 11/1988 | Siemers | 164/46 |
| 4,782,992 | 11/1988 | Doble | 228/190 |
| 4,786,566 | 11/1988 | Siemers | 228/263.12 |
| 4,805,833 | 2/1989 | Siemers | 228/190 |
| 4,807,798 | 2/1989 | Eylon et al. | 228/190 |
| 4,807,801 | 2/1989 | Nakamura | 148/127 |
| 4,820,359 | 4/1989 | Bevilacqua et al. | 148/127 |
| 4,838,337 | 6/1989 | Siemers | 164/46 |
| 4,896,815 | 1/1990 | Rosenthal et al. | 228/190 |
| 4,906,306 | 3/1990 | Araki et al. | 148/127 |

*Primary Examiner*—Upendra Roy
*Attorney, Agent, or Firm*—Paul E. Rochford; James C. Davis, Jr.; James Magee, Jr.

[57] ABSTRACT

A method of controlling the internal dimensions of a filament reinforced ring structure is taught. The method involves providing the ring structure with an internal dimension which is slightly smaller than the specification of the final dimension which is sought. The ring structure is mounted over a solid mandrel having a coefficient of thermal expansion which is greater than that of the ring structure. The solid mandrel is mounted within the ring structure and the combination is heated to a temperature at which the outer dimension of the mandrel is greater than that of the internal dimension of the ring structure. The result is to enlarge the internal dimensions of the ring structure to a value conforming very closely to a specification for the ring structure.

10 Claims, 1 Drawing Sheet

METHOD FOR ID SIZING OF FILAMENT REINFORCED ANNULAR OBJECTS

CROSS REFERENCE OF RELATED APPLICATIONS

The present invention relates closely to copending application Ser. No. 07/493651 filed Mar. 15, 1990. The texts of these related applications are incorporated herein by reference.

BACKGROUND OF THE INVENTION

The present invention relates generally to annular structures formed with metal matrix and with a filament reinforcement. More particularly it relates to annular structures having a titanium base matrix and reinforced by filaments of silicon carbide and to the precise sizing of the internal dimensions of such structures to a predetermined value within very small limitations.

The preparation of titanium alloy base foils, sheets, and similar articles and of reinforced structures in which silicon carbide fibers are embedded in a titanium base alloy are described in U.S. Pat. Nos. 4,775,547; 4,782,884; 4,786,566; 4,805,294; 4,805,833; and 4,838,337; assigned to the same assignee as the subject application. The texts of these patents are incorporated herein by reference. Preparation of composites as described in these patents is the subject of intense study inasmuch as the composites have very high strength properties in relation to their weight. One of the properties which is particularly desirable is the high tensile properties imparted to the structures by the high tensile properties of the silicon carbide fibers or filaments. The tensile properties of the structures are related to the rule of mixtures. According to this rule the proportion of the property, such as tensile property, which is attributed to the filament, as contrasted with the matrix, is determined by the volume percent of the filament present in the structure and by the tensile strength of the filament itself. Similarly, the proportion of the same tensile property which is attributed to the matrix is determined by the volume percent of the matrix present in the structure and the tensile strength of the matrix itself.

Prior to the development of the processes described in the above-referenced patents, such structures were prepared by sandwiching the reinforcing filaments between foils of titanium base alloy and pressing the stacks of alternate layers of alloy and reinforcing filament until a composite structure was formed. However, that prior art practice was found to be less than satisfactory when attempts were made to form ring structures in which the filament was an internal reinforcement for the entire ring.

The structures taught in the above-referenced patents and the methods by which they are formed, greatly improved over the earlier practice of forming sandwiches of matrix and reinforcing filament by compression.

Later it was found that while the structures prepared as described in the above-referenced patents have properties which are a great improvement over earlier structures, the attainment of the potentially very high ultimate tensile strength of these structures did not measure up to the values theoretically possible. The testing of composites formed according to the methods taught in the above patents has demonstrated that although modulus values are generally in good agreement with the rule of mixtures predictions, the ultimate tensile strength is usually much lower than predicted by the underlying properties of the individual ingredients to the composite A number of applications have been filed which are directed toward overcoming the problem of lower than expected tensile properties and a number of these applications are copending. These include applications Ser. No. 445,203, filed Dec. 4, 1989; Ser. No. 459,894, filed Jan. 2, 1990; and Ser. Nos. 455,041 & 455,048, both filed Dec. 22, 1989. The texts of these applications are incorporated herein by reference.

One of the structures which has been found to be particularly desirable in the use of the technology of these reference patents is an annular article having a metal matrix and having silicon carbide filament reinforcement extending many times around the entire ring. Such ring structures have very high tensile properties relative to their weight particularly when compared to structures made entirely of metal. However, it has been found difficult, particularly because of the very high temperatures which must be used in forming such articles to produce a ring structure which is dimensionally very precise in its internal dimensions. Such structures must be precise in their internal dimensions in order for the structures to be used most effectively in end use applications inasmuch as the structures are often used as part of a more complex structure and for this purpose are fitted over one or a number of elements in a circular form in order to serve as a reinforcing ring.

One of the structures which is formed has the reinforcing filament wound many times and in many layers around the circumference is a reinforced ring structure. The reinforced ring can be used for example as a reinforcing ring for the compressor blades of a compressor disk of a jet engine. In order to serve to hold the blades in a compressor stage of a jet engine a large number of layers of reinforcing filaments are required. It has been found that it is very difficult to continue to add more and more layers of filament reinforcement to a ring structure because of differences thermal expansion coefficient and other factors. One way in which this problem has been solved is by forming a series of concentric rings which are then assembled together to provide a reinforced ring structure having more than 100 layers of reinforcement. Such ring structures are of quite large diameter of the order of a foot or several feet and must nevertheless be nested together within very close tolerances of only a few thousands of an inch. Obviously when such structures are out of tolerance dimensionally, it is very difficult to accomplish such an assembly of several concentric rings into a single assembled ring structure.

BRIEF STATEMENT OF THE INVENTION

It is, accordingly, one object of the present invention to provide a method by which a dimensionally out-of-specification fiber reinforced ring having a metal matrix may be brought into specification.

Another object is to provide a method of forming a reinforced matrix ring structure having internal dimensions which are at or very close to a predetermined specification.

Another object is to provide a silicon carbide reinforced titanium ring of several inches to several feet in diameter having internal dimensions which are accurate to within a few thousandths of an inch.

Other objects will be in part apparent and in part pointed out in the description which follows.

In one of its broader aspects the objects of the present invention can be achieved by providing a reinforced ring structure having a silicon carbide filamentary reinforcement embedded in a plasma spray deposited matrix where the inner dimensions of the ring are slightly smaller than the specified dimensions for the ring. The ring is next placed onto a metal cylinder of a metal having a known coefficient of expansion which is significantly higher than that of the reinforced structure. The ring and the contained cylinder are then heated to a temperature above the relaxation temperature of the matrix of the ring at which the cylinder has a larger diameter than the inside diameter of the ring structure. The ring and cylinder are then cooled to room temperature and separated from each other. It is found that the cooled ring can be removed from the cylinder more easily than it could be put on the cylinder because the inside diameter of the ring has been enlarged by the heating.

It has been observed that the enlargement of the internal dimensions of a ring structure in this fashion actually modifies and alters the arrangement of the matrix material relative to the reinforcement. Thus we have observed that there is an actual compaction of the internal portion of the ring structure as a result of the heating and expansion of the cylinder in the manner just described. The net effect is that some of the matrix material is moved outward toward the reinforcing filaments and there may be actual movement of the matrix material between the filaments. The result of such movement can be to place the filamentary reinforcement in tension and to place the matrix material at the inner portion of the ring structure in compression. It is preferred to have the filamentary reinforcing material in tension and to have the matrix material in compression as this enhances the overall behavior of the ring structure as a retaining ring for use in air craft engine structures.

One of the reasons why it is important to precisely dimension the ring structure is in order to permit assembly of the ring into a larger structure. One such structure is an assembly of concentric or nested rings. It is possible to nest rings and to cause them to bond into a single ring structure by a conventional HIPing treatment. However, in order for the HIPing treatment to be effective in forming a metallurgical bond between two or more nested rings the rings must be assembled concentrically so that the outer surface of an inner ring is separated by only 0.003 inches from the inner surface of the next outer ring. The achievement of such close tolerances of some reinforced ring structures is not achieved well, if at all, by conventional machining.

One structure which cannot be machined to such tolerances is a ring having only one or a few plies of reinforcement. The problem for such rings is that they cannot be gripped or held adequately for conventional machining without being bent or distorted as the machining takes place. The result is that the ring may appear round as the machining takes place. However, it loses its roundness and displays out-of-round shape once released from the chuck used to hold it during the machining. The present method accomplishes modification of such thin ring internal dimensions without loss of final roundness of the ring.

Another case for which conventional machining is also inadequate involves a ring structure which is oval or elliptical or otherwise a non-round ring. Conventional machining is not equipped to handle the machining of the internal dimensions of such ring non-round structures but the subject method is effective in uniformly altering the dimensions of such structures without altering the non-round shapes.

BRIEF DESCRIPTION OF THE DRAWINGS

The description which follows will be understood with greater clarity if reference is made to the accompanying drawings in which.

DETAILED DESCRIPTION OF THE INVENTION

Figure 1:
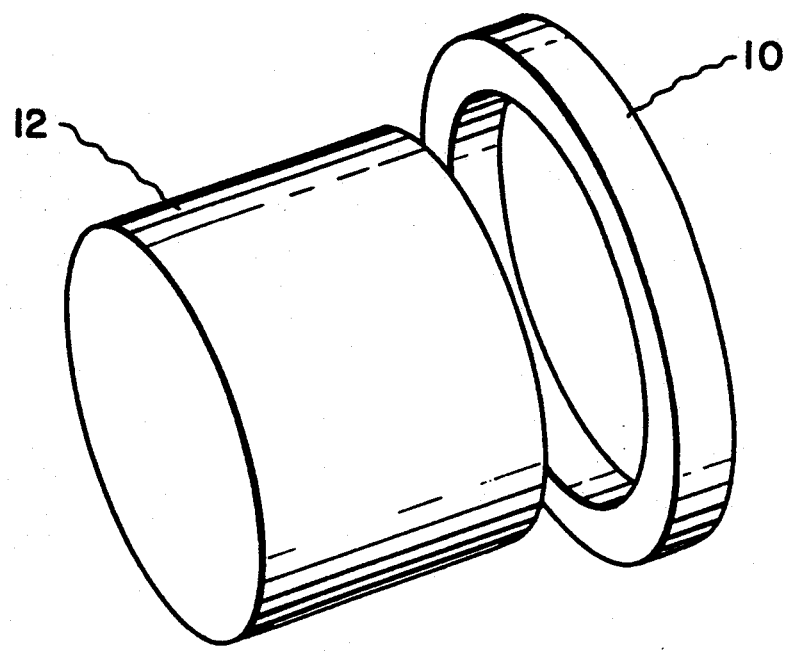
FIG. 1 is a side elevation of a cylinder and ring prior to assembly.

A low pressure r.f. plasma-spray process is used for the fabrication of multi-layer titanium base alloy ring elements where the titanium base alloy serves as a matrix in a composite structure containing reinforcing filaments. The silicon carbide filaments are the principal filaments of concern for these reinforced composite structures. The titanium base alloy can be a conventional titanium such as Ti-64 (Titanium-6 Aluminum-4 Vanadium by weight); Ti-6242 (Titanium-6 Aluminum-2 Tin-4 Zirconium-2 Molybdenum by weight); Ti-1421 (Titanium-14 weight percent aluminum-21 weight percent niobium) or it can be a titanium aluminide. Such aluminide may be a gamma aluminide containing 48 atomic % titanium, 48 atomic % aluminum, 2 atomic % of niobium and 2 atomic % of chromium for example, or another gamma aluminide having a appreciable ductility of more than 1%.

The composite ring elements are fabricated by the plasma-spraying of a ⅛ inch thick layer of the matrix alloy onto a cylinder of mild steel. The steel mandrel is removed from the matrix alloy layer by chemical dissolution in a nitric acid solution or by thermal debonding using the thermal expansion difference between the titanium alloy matrix and the mild steel. The "as-sprayed" titanium alloy matrix ring is then wound with continuous SiC filament in a subsequent winding operation as described in the patents referenced in the background statement. The filament wound cylinder is then over-sprayed with additional titanium base matrix alloy to completely cover the filament. The winding and spraying steps are repeated until the desired number of plies is obtained on the composite ring element.

To improve filament spacing and alignment and interlayer bonding the as-sprayed layer may be machined or otherwise rendered smooth.

Since the low pressure RF plasma-spray process yields an as-sprayed density less than theoretical it is necessary to HIP densify the composite ring. The term HIP signifies heating and isostatic pressing which is a well-known conventional processing step. A dimensional change of the ring during HIPing can lead to an uncertain internal dimension to the ring structure.

The composite structure to be formed is one having as many as 150 layers. A structure with about 150 layers of composite is a novel structure which is deemed suitable for use, for example, as reinforcing rings in aircraft engine compressor structures. One way of achieving this number of layers is by "nesting" multiple composite ring elements which are separately fabricated. Following the separate fabrication and separate HIP densification, such composite ring elements are "nested" together to form a ring assembly which can be HIP bonded to form a composite ring with the desired number of plies.

Regarding the individual ring elements which are assembled into the nested composite, an individual ring element of about 20 layers will be exposed to 22 to 23 thermal cycles associated with the RF plasma-spray process. Also, the internal dimensions of the ring may be altered depending on the initial dimensions of the ring and also on the degree of change due to the HIP consolidation of the ring. To diffusion bond nested ring elements, it is required that the outside diameter of the inner ring be about 0.003 to 0.005 inches smaller than the inside diameter of the outer ring. These close tolerances on parts that may be several feet in diameter are very difficult to achieve if the original parts are dimensionally out of specification. A need exists for a method which permits rings to be formed originally with the desired and needed dimensions or to restore the dimensions of the metal matrix composite rings prior to nesting.

Figure 2:
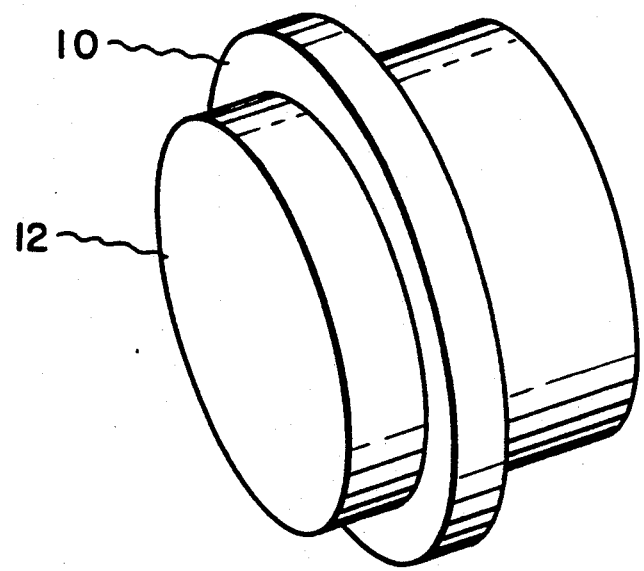
FIG. 2 is a side elevation similar to that of FIG. 1 but showing the cylinder and ring after assembly.

We have discovered that a composite ring which has internal dimensions which are too small can be expanded using a simple thermal treatment in the presence of a solid round mandrel such as 12 of FIG. 1 having a thermal expansion coefficient larger than that of the composite. We have discovered that during heat treatment above the stress relaxation temperature of the matrix alloy the high expansion coefficient mandrel expands at a greater rate than the composite and thus causes a pushing action against the matrix material of the composite. The composite inside diameter is thereby enlarged while the internal stresses of the composite matrix alloy are relaxed at the elevated temperature. This is accomplished in the manner illustrated in FIG. 2.

One factor on which the success of our method depends is that the stress relaxation temperature of the filamentary reinforcements used in metal matrix composites is considerably higher than that of the matrix alloy. As a consequence it is believed that the composite internal stresses can be modified using the treatment which we have developed. We believe that the relatively large tensile stresses in the matrix alloy and the compressive stresses in the filament resulting from the thermal expansion difference between the matrix and the reinforcement can be reduced if the filaments are maintained in a state of tension while the composite is maintained at or above the matrix stress relaxation temperature. During cooling from the heat treatment temperature the fiber stress would gradually change from tensile to compressive depending on the relative stress temperature and thermal expansion behavior of the matrix and fibers.

Furthermore we believe that the maintenance of the fibers in a state of tension, and the matrix in the state of compression, results in improved composite properties particularly when a brittle matrix alloy is used. A compressive stress in the matrix is believed to increase the strain to failure of the matrix and composite. The thermal treatment described herein is believed to generate the desired stress state in the composite.

The following example is given to illustrate how the method of the present invention can be carried into effect and to illustrate the types of structures which are formed thereby.

EXAMPLE

A 4 inch diameter 4 inch wide composite ring was fabricated using a Ti-1421 alloy as the matrix alloy.

Ti-1421 is an alloy containing 14 atomic % aluminum 21 atomic % niobium and the remainder titanium. The reinforcement for the titanium base matrix was silicon carbide filaments. These filaments were obtained from Textron Corporation and are identified as SCS-6 filaments.

A 4" diameter cylinder of mild steel was provided to serve as a mandrel. A coating of 5 mils of $Al_2O_3$ was formed on the mild steel mandrel by plasma spraying the $Al_2O_3$ in air. A sleeve in the form of a ⅛ inch thick layer of the matrix alloy was plasma-sprayed onto the $Al_2O_3$ coated cylinder of mild steel. The ⅛" thick layer of the matrix alloy spontaneously separated from the $Al_2O_3$ coated surface of the mandrel on cooling.

The "as-sprayed" titanium alloy matrix ring was then machined smooth. The smooth matrix ring was then grooved with a continuous helical thread about 0.003 inches deep to allow precise placement of the SiC filament in a subsequent winding operation. A continuous SiC filament was wound into the helical grooves and anchored at each end. The filament wound cylinder was then oversprayed with additional Ti-1421 alloy and the alloy and the plasma-sprayed alloy deposit was machined to a smooth surface. Again the smooth surface was grooved with a continuous helical thread about 0.003 inches deep to again allow the precise placement of continuous SiC filament. The SiC filament was wound into the grooves, was anchored again at each end, and was oversprayed with additional Ti-1421 alloy.

During the fabrication of the second ply, the ring was accidently overheated and experienced considerable distortion and some melting where it contacted the steel mandrel. The 4 inch wide composite two-ply ring was cut to separate several ¾ inch wide two ply composite rings from the damaged composite.

One of the several ¾ inch wide composite four inch diameter rings was selected. This ring had the least damage of the several cut from the 4 inch wide composite ring. The ring was forced over a solid stainless steel mandrel about 40 thousandths of an inch smaller than the ID of the ring structure. The ring was initially 175 thousandths of an inch out-of-round due to the damage. The mandrel and ring were heated to about 900° C. for about 15 minutes and then cooled to room temperature in a vacuum. The ring was then found to be true round to within 0.003 inches from this heat treatment.

A second solid mandrel of 304L stainless steel was machined to have an outside diameter that was 0.005 inches smaller than the inside diameter of the heat treated composite ring. The composite ring fit tightly around the stainless steel mandrel. The stainless steel of the mandrel had a coefficient of thermal expansion greater than that of the composite ring structure. The composite and mandrel were heated to 900° C. and maintained at temperature for fifteen minutes and then cooled to room temperature in a vacuum furnace. The inside diameter of the second composite ring was found to be 0.020 inches larger than it was prior to the second thermal treatment. It was found to be round to within 0.002 inches. The second thermal treatment had stretched the inside diameter of the composite. Chemical dissolution of the matrix alloy in an acid solution revealed that the SiC fibers were not broken by the second thermal treatment resulting in the expansion of the second cut composite ring.

It will be appreciated by those skilled in this art, based on the teachings provided above, that it is possible to adjust the internal dimensions of a filament reinforced ring structure to precise values employing the method of the present invention. This ability to precisely adjust the internal dimensions is applicable to ring structures which cannot be adjusted by conventional machining for various reasons.

For example, a ring structure made up with only a single ply of reinforcement or with only a few plies cannot be machined effectively by conventional machining practice. However, as particularly illustrated by the example above, the internal dimensions of this ring structure can be effectively adjusted by the method of this invention.

Also, where the ring structure is an oval or other non-round configuration, the present method, employing a suitably shaped mandrel, can effectively alter the internal dimensions of the ring although such adjustment is not possible employing conventional machining practice.

What is claimed is:

1. A method for increasing the internal diameter of a fiber reinforced composite ring structure to a precise dimensional value which comprises,
    providing a fiber reinforced composite ring structure having a metal matrix and a fibrous reinforcement embedded within the matrix,
    providing a solid mandrel having an external diameter slightly smaller than the internal diameter of the composite ring structure and having a thermal coefficient of expansion greater than that of the ring structure,
    inserting the mandrel into the opening of the ring structure,
    heating the mandrel and ring structure to a temperature at which the external dimensions of the mandrel are larger than the internal dimensions of the ring structure, and
    cooling the mandrel and ring structure and removing the mandrel from the ring structure.

2. The method of claim 1, in which the metal of the matrix is a titanium base metal.

3. The method of claim 1, in which the metal of the matrix is a titanium aluminide having a ductility of more than one percent.

4. The method of claim 1, in which the filamentary reinforcement is a ceramic reinforcement.

5. The method of claim 1, in which the filamentary reinforcement is silicon carbide filaments.

6. The method of claim 1, in which the filamentary reinforcement is single crystal aluminum oxide filament.

7. The method of claim 1, in which the metal is Ti-64.

8. The method of claim 1, in which the metal is Ti-6242.

9. The method of claim 1, in which the metal is Ti-1421.

10. The method of claim 1, in which the metal is a titanium aluminide having the formula $Ti_{48}Al_{48}Nb_2Co_2$.

* * * * *